(12) United States Patent
Ostrander

(10) Patent No.: US 8,677,816 B2
(45) Date of Patent: Mar. 25, 2014

(54) WIND CURRENT INDICATOR

(76) Inventor: Richard Ostrander, Granger, IN (US)

( * ) Notice: Subject to any disclaimer, the term of this patent is extended or adjusted under 35 U.S.C. 154(b) by 35 days.

(21) Appl. No.: 13/561,893

(22) Filed: Jul. 30, 2012

(65) Prior Publication Data

US 2013/0025361 A1 Jan. 31, 2013

Related U.S. Application Data

(60) Provisional application No. 61/512,469, filed on Jul. 28, 2011.

(51) Int. Cl.
*G01P 13/00* (2006.01)
(52) U.S. Cl.
USPC ....................................................... 73/170.01
(58) Field of Classification Search
USPC ........................................ 73/170.01–170.05
See application file for complete search history.

(56) References Cited

U.S. PATENT DOCUMENTS

| | | | | |
|---|---|---|---|---|
| 5,291,778 A | * | 3/1994 | Dexheimer et al. | 73/170.05 |
| 5,464,675 A | * | 11/1995 | Weir | 428/78 |
| 6,550,418 B2 | * | 4/2003 | Williamson | 116/264 |
| 2006/0005618 A1 | * | 1/2006 | Thomas | 73/170.01 |
| 2007/0186641 A1 | * | 8/2007 | Anderson | 73/170.01 |

* cited by examiner

*Primary Examiner* — Andre Allen
(74) *Attorney, Agent, or Firm* — Robert M. Downey, P.A.

(57) ABSTRACT

A wind current indicator device is provided for use in assisting in the hunting of wild game animals and includes a thin strand of fiber having a lightweight feather affixed at a first end and a swivel member affixed to opposite second end. The swivel member includes two rotating loops on opposite sides, wherein the first rotating loop is secured to the strand of fiber while the second rotating loop is secured to a second strand of fiber that is adapted for attachment to an object, such as the barrel of a rifle. In operation, wind currents lift and carry the feather, pulling the strand taut, indicating the direction of the wind current. Each of the rotating loops independently pivots and rotates in response to changes in wind current direction, thereby avoiding twisting and entanglement of either strand portion.

15 Claims, 3 Drawing Sheets

WIND CURRENT INDICATOR

This non-provisional patent application is based on provisional patent application Ser. No. 61/512,469 filed on Jul. 28, 2011.

BACKGROUND OF THE INVENTION

1. Field of the Invention

The present invention relates to wild game hunting and, more particularly, to a wind current indicator device for indicating the direction of wind currents.

2. Discussion of the Related Art

Preparation for hunting wild game animals requires positioning of the hunter such that the animals are not alerted to the hunter's presence. Effective positioning entails preparation beyond visible concealment from game animals, however, as most animals have a heightened sensitivity to odors and will likely scatter once a human's scent is detected. Therefore, hunters must position themselves such that their scent is not carried with the wind in the direction of the hunted animals. While wind direction can be easy to detect on particularly brisk days, the direction of ambient winds on calm days is often imperceptible, and there can be many changes in direction of such ambient winds. And because ambient winds are sufficient to carry detectable odors a considerable distance, it is necessary for a hunter to remain "downwind" in relation to hunted game at all times.

A number of attempts have been directed towards addressing hunters' need for detecting the direction of subtle winds relative to his or her location. An example of a wind detecting device is presented in U.S. Pat. No. 5,186,118 to Stinson, which discloses a wind-gauging apparatus that disperses silica particles in the form of a floating cloud which is carried in the direction of ambient wind, thereby indicating wind speed and direction. While the '118 apparatus is useful for its intended purpose, indication of wind direction and speed requires the user to actuate dispersal of the particles, thereby making detection of changes in wind direction somewhat problematic.

Another example of a wind detecting device is described in U.S. Pat. No. 7,350,411 to Anderson. The '411 patent discloses a hunting wind sensor device that utilizes a plurality of light weight filaments attached to an elongated body that is adaptable for attachment to an object, such as a hunter's rifle or bow. While the '411 device is useful for its intended purpose, its design leaves open the possibility that the filaments will become entangled with the elongated body and/or the object to which it is attached.

Therefore, given the shortcomings of these devices and others, there remains a need for a wind current indicator that is both effective and easy to use.

OBJECTS AND ADVANTAGES OF THE INVENTION

Considering the foregoing, it is a primary object of the present invention to provide a wind current indicator device that indicates the direction of the wind currents.

It is a further object of the present invention to provide a wind current indicator device that provides a continuous indication of the wind current direction.

It is a further object of the present invention to provide a wind current indicator device that is undetectable by wild game animals.

It is a further object of the present invention to provide a wind current indicator device that can be adapted for attachment to any object.

It is still a further object of the present invention to provide a wind current indicator device that is inexpensive to manufacture.

It is still a further object of the present invention to provide a wind current indicator device that is easy to use.

It is still a further object of the present invention to provide a wind current indicator device that can be easily transported.

It is yet a further object of the present invention to provide a wind current indicator device that is reusable.

These and other objects and advantages of the present invention are readily apparent with reference to the detailed description and accompanying drawings.

SUMMARY OF THE INVENTION

The present invention is directed to a wind current indicator device is providing for use in assisting in the hunting of wild game animals. The wind current indicator device includes a thin strand of fiber having a lightweight feather affixed at a first end and a swivel member affixed to an opposite second end. The swivel member includes two rotating loops on opposite sides, wherein the first rotating loop is secured to the strand of fiber while the second rotating loop is secured to a second strand of fiber that is configured for attachment to an object, such as the barrel of a rifle. In operation, wind currents lift and carry the feather, pulling the strand taut, indicating the direction of the wind currents. Each of the rotating loops pivots and rotates within the swivel member in response to changes in wind current direction, thereby avoiding twisting and entanglement of either strand portion.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
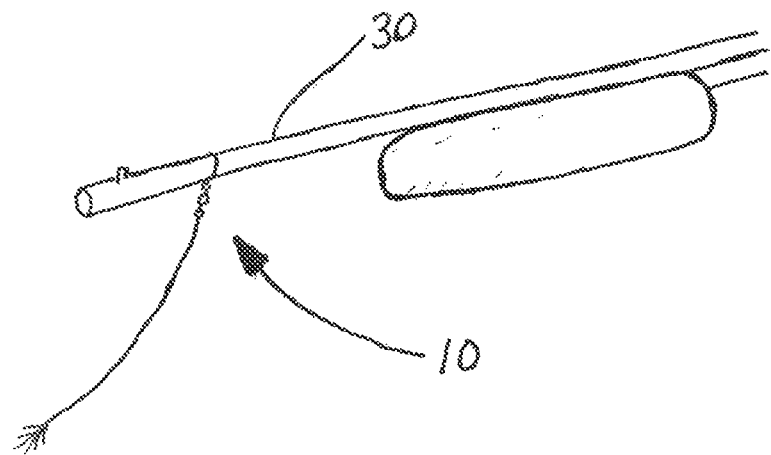
FIG. 1 is a perspective view of the wind current indicator device of the present invention illustrating the device when attached to the barrel portion of a rifle.

Referring the several views of the drawings, the wind current indicator device of the present invention is shown and is generally indicated as 10.

The wind current indicator device 10 is illustrated in FIGS. 1-4 and includes a lightweight, thin strand of fiber 12 in connection with a lightweight feather 14 at a first end 16 and a swivel member 18 at an opposite second end 20 of the strand 12. The second end 20 of the strand 12 is tied, or otherwise affixed, to one of two rotating loop members 22A and 22B, each having a spherical proximal end 23A and 23B secured within the swivel member 18 to form a ball and socket joint connection, as illustrated in FIG. 2A. The ball and socket joint connection allows the rotating loop members to pivot and rotate about the joint connection in response to the external forces produced by the wind current. The opposite rotating loop member 22A or 22B is provided for securing a second strand of fiber 24, which may be used to secure the device 10 to an object. Other forms of connection, such as an ellipsoidal joint, may be used to couple the rotating loop members to the swivel member.

Figure 2:
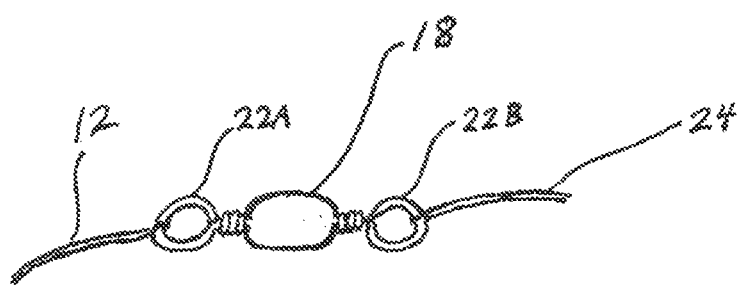
FIG. 2 is an isolated view of the swivel member and opposite facing rotating loop members.
Figure 2A:
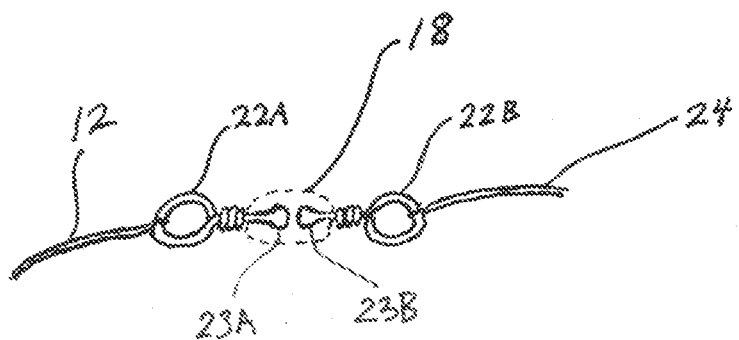
FIG. 2A is an isolated view of the swivel member, shown in partial cross section, illustrating the ball and socket joint connection of the rotating loop members within the swivel member.
Figure 3:
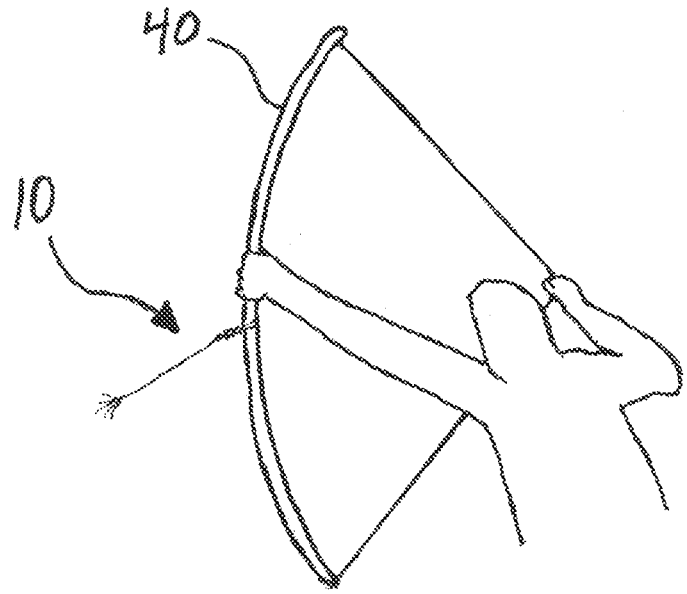
FIG. 3 is a perspective view of the wind current indicator device of the present invention illustrating the device when attached to the lower portion of a bow.
Figure 4:
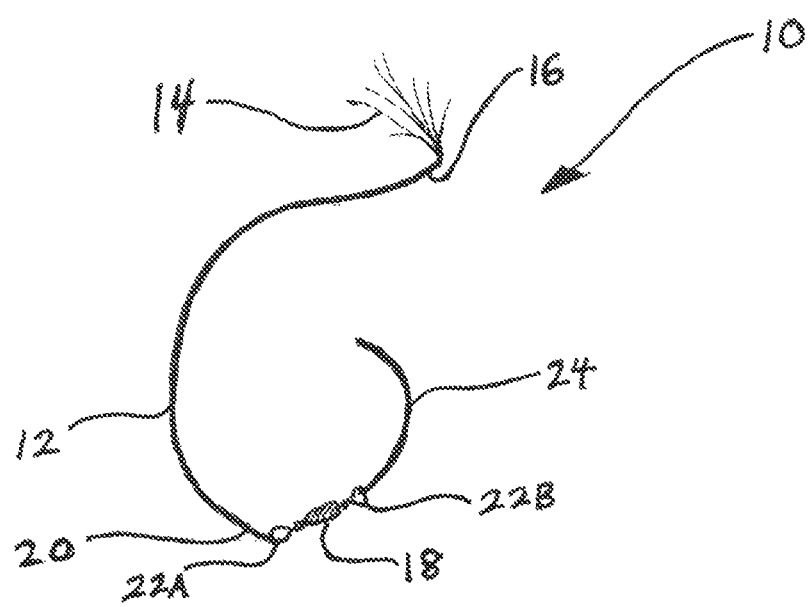
FIG. 4 is a perspective view of the wind current indicator of the present invention.

As illustrated in FIGS. 1 and 3, the wind current indicator device 10 may be secured to an object such as a rifle 30 or a bow 40 by tying, or otherwise securing, the second strand of fiber 24 to the object. In a preferred embodiment, the strand 12 is approximately 20 inches in length. If the length of the strand 12 goes beyond the preferred length, it is possible that the strand 12 and feather 14 will not properly react to the wind current.

In operation, wind currents lift and carry the feather 14 in the direction of the wind, pulling the strand 12 taut and effectively indicating the direction of the wind current. Fluctuations in direction of the wind current are readily identifiable by a user, as the feather 14 and strand 12 will shift in response, thereby alerting the user and providing an opportunity to take a shot at the target animal before detection or to relocate if the user is not sufficiently downwind.

The ball and socket method of attachment between the rotating loop members 22A and 22B and swivel member 18 allows the proximal portion of each rotating loop member 22A and 22B to pivot and rotate within the swivel member 18 in response to changes in wind currents, which prevents the device 10 from twisting about itself and becoming entangled, which might otherwise lead to poor performance.

While the present invention has been shown and described in accordance with several preferred and practical embodiments thereof, it is recognized that departures from the instant disclosure are fully contemplated within the spirit and scope of the invention.

What is claimed is:

1. A wind current indicator comprising:
    a first lightweight fibrous strand having a first end and a second end;
    a second lightweight fibrous strand having a first end and a second end, and the first end of said second lightweight fibrous strand being releasably securable to an object;
    a feather releasably securable to the first end of said first lightweight fibrous strand;
    a swivel member having a interior cavity defining a socket, and said swivel member including a first and second opening each being in communication with the interior cavity;
    a first and second loop member each including a spherical component having a diameter smaller than the diameter of the interior cavity of said swivel member and larger than the diameter of each of the openings on said swivel member, and said spherical component of each of said first and second loop members being provided to form a ball and socket joint when coupled with the socket of said swivel member, whereby each of said first and second loop members is pivotable and rotatable about the ball and socket joint in response to external forces produced by the wind current;
    said first loop member being structured and disposed for coupling with the second end of said first lightweight fibrous strand;
    said second loop member being structured and disposed for coupling with the second end of said second lightweight fibrous strand; and
    wherein said feather is lifted in the direction of the external forces produced by the wind current thereby indicating the direction of the wind current.

2. The wind current indicator as recited in claim 1 wherein said first lightweight fibrous strand is between 10 inches and 20 inches in length.

3. The wind current indicator as recited in claim 1 wherein said first lightweight fibrous strand is less than 10 inches in length.

4. The wind current indicator as recited in claim 1 wherein the object is a gun barrel.

5. The wind current indicator as recited in claim 1 wherein the object is a bow.

6. A wind current indicator comprising:
    a first lightweight fibrous strand having a first end and a second end;
    a second lightweight fibrous strand having a first end and a second end, and the first end of said second lightweight fibrous strand being releasably securable to an object;
    a feather releasably securable to the first end of said first lightweight fibrous strand;
    a swivel member;
    a first and second loop member each being coupled with said swivel member;
    said first loop member being structured and disposed for coupling with the second end of said first lightweight fibrous strand;
    said second loop member being structured and disposed for coupling with the second end of said second lightweight fibrous strand; and
    wherein said feather is lifted in the direction of the external forces produced by the wind current thereby indicating the direction of the wind current.

7. The wind current indicator as recited in claim 6 wherein said first lightweight fibrous strand is between 10 inches and 20 inches in length.

8. The wind current indicator as recited in claim 6 wherein said first lightweight fibrous strand is less than 10 inches in length.

9. The wind current indicator as recited in claim 6 wherein said first and second loop members are pivotable about said swivel member.

10. The wind current indicator as recited in claim 6 wherein said first and second loop members are rotatable about said swivel member.

11. The wind current indicator as recited in claim 6 wherein said first and second loop members are pivotable and rotatable about said swivel member.

12. The wind current indicator as recited in claim 6 wherein said first and second loop members are coupled with said swivel member by a ball and socket joint.

13. The wind current indicator as recited in claim 6 wherein said first and second loop members are coupled with said swivel member by an ellipsoidal joint.

14. The wind current indicator as recited in claim 6 wherein said object is a gun barrel.

15. The wind current indicator as recited in claim 6 wherein said object is a bow.

* * * * *